United States Patent
Barsotti et al.

(10) Patent No.: US 6,428,898 B1
(45) Date of Patent: Aug. 6, 2002

(54) SILICON REACTIVE OLIGOMERS AND COATING COMPOSITIONS MADE THEREFROM

(75) Inventors: Robert J. Barsotti, Franklinville, NJ (US); Isidor Hazan, Southfield; John David Nordstrom, Huntington Woods, both of MI (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/582,834

(22) PCT Filed: Feb. 3, 1999

(86) PCT No.: PCT/US99/02266

§ 371 (c)(1),
(2), (4) Date: Jun. 30, 2000

(87) PCT Pub. No.: WO99/40140

PCT Pub. Date: Aug. 12, 1999

Related U.S. Application Data

(60) Provisional application No. 60/073,912, filed on Feb. 6, 1998.

(51) Int. Cl.$^7$ .............................. B32B 9/04; B05D 3/02; C08G 77/48
(52) U.S. Cl. ........................... 428/447; 528/12; 528/17; 528/21; 528/23; 528/26; 528/29; 528/40; 556/463; 556/465; 427/387; 106/287.12; 106/287.13
(58) Field of Search ............................. 528/12, 17, 21, 528/23, 26, 29, 40; 556/463, 465; 106/287.12, 287.13; 427/387; 428/447

(56) References Cited

U.S. PATENT DOCUMENTS

| 4,732,929 A |   | 3/1988 | Wen-Hsuan et al. |
|---|---|---|---|
| 4,804,732 A | * | 2/1989 | Ryntz et al. .................. 528/28 |
| 5,527,936 A |   | 6/1996 | Hasan et al. |
| 5,753,756 A | * | 5/1998 | Aerts et al. .............. 525/111.5 |
| 5,786,435 A | * | 7/1998 | Marutani et al. ........... 526/273 |
| 6,040,009 A | * | 3/2000 | Marutani et al. ........... 427/241 |
| 6,080,816 A | * | 6/2000 | Gregrorvich et al. ....... 525/100 |
| 6,221,494 B1 | * | 4/2001 | Barsotti et al. .......... 428/423.1 |

FOREIGN PATENT DOCUMENTS

| WO | WO 96/27599 A |   | 9/1996 |
|---|---|---|---|
| WO | WO 96/39468 A |   | 12/1996 |
| WO | WO 97/44402 | * | 11/1997 |

* cited by examiner

Primary Examiner—Robert Dawson
Assistant Examiner—Jeffrey B. Robertson
(74) Attorney, Agent, or Firm—Sudhir G. Deshmukh

(57) ABSTRACT

The present invention is directed to low VOC curable coating compositions suitable for use in various mar and etch resistant coatings, such as in automotive coatings. The binder of the composition includes silicon/hydroxyl and cross-linking components. The silicon/hydroxyl component includes one or more reactive oligomers having linear or branched cycloaliphatic moiety and at least two functional groups with at least one being a silane or silicate group, the remaining being a hydroxyl group. Applicants have unexpectedly discovered that by including silane or silicate functionalities in these reactive oligomers, the solids level of the composition can be significantly increased at reduced composition viscosities. As a result, such high solids low VOC compositions can be readily applied by conventional application means, such as by spraying.

15 Claims, No Drawings

# SILICON REACTIVE OLIGOMERS AND COATING COMPOSITIONS MADE THEREFROM

This application claims the benefit of provisional application 60/073,912 filed Feb. 6, 1998.

BACKGROUND OF THE INVENTION

This invention relates to low VOC (volatile organic component) curable coating compositions and more particularly relates to high solids coating compositions having low application viscosity, which are particularly suited for automotive finishes.

As the amount of the VOC from solvent based coating compositions permitted to be released in the atmosphere continues to drop, there is a continuing need for reducing the VOC content of solvent based coating compositions without attenuating their performance characteristics or the ease with which the coatings from these compositions can be applied over substrates. A number of approaches have been tried, one being to increase the solids content of the coating compositions without affecting the performance characteristics of the resultant coating, particularly the mar-resistance and environmental etch resistance.

One such approach, described in PCT Publication No. WO97/44402, is directed to a low VOC coating composition having a linear or branched cycloaliphatic moiety-containing oligomers which, upon cure, form a three-dimensional network having chains of substantially uniform, and controllable molecular weight between the crosslinks. The functionalized oligomers have weight average molecular weights not exceeding 3,000 and a polydispersity not exceeding 1.5. However, a need still exists for low VOC, high performance coating compositions that not only cure under ambient conditions or at elevated temperatures but are still easy to apply using conventional application processes, such as spray coating. The present invention solves the problem by reducing the application viscosity at high solids level without adversely affecting the performance characteristics of the resultant coating.

SUMMARY OF THE INVENTION

The present invention is directed to a curable coating composition comprising a binder, which comprises:

a silicon/hydroxyl component and a crosslinking component, said silicon/hydroxyl component comprising:

(I). A silicon/hydroxyl reactive oligomer having a linear or branched cycloaliphatic moiety and at least two functional groups with at least one of said groups being a silane or a silicate, the remaining groups being hydroxyl groups;

(II). A silicon reactive oligomer having a linear or branched cycloaliphatic moiety and at least two functional groups being a silane, silicate or a combination thereof, and a hydroxy acrylic polymer, a hydroxy polyester, a silicon free reactive oligomer having a linear or branched cycloaliphatic moiety and at least two hydroxyl groups, or a combination thereof; or (III). A combination of said (I) and (II), wherein said silicon/hydroxyl reactive oligomer, said silicon reactive oligomer and said silicon free reactive oligomer all having a GPC weight average molecular weight not exceeding 4,000 and a polydispersity not exceeding about 1.7; and said crosslinking component comprising a blocked crosslinker or an unblocked crosslinker wherein said blocked or unblocked crosslinkers being provided with at least two isocyanate groups and wherein the ratio of equivalents of isocyanate per equivalent of hydroxyl groups is in the range of from 0.3/1 to 2.0/1.

One of the advantages of the coating composition of the present invention is its significantly low VOC content even at significantly high solids level.

The coating composition of the present invention advantageously provides for a highly crosslinked system at significantly low application viscosities.

Another advantage of the coating composition of the present invention is that it produces coatings having high performance characteristics, such as mar and etch resistance even at high gloss.

DETAILS OF THE INVENTION

As defined herein:

"Two-pack coating composition" means a thermoset coating composition comprising two components stored in separate containers. These containers are typically sealed to increase the shelf life of the components of the coating composition. The components are mixed prior to use to form a pot mix. The pot mix has a limited potlife typically of minutes (15 minutes to 45 minutes) to a few hours (4 hours to 6 hours). The pot mix is applied as a layer of desired thickness on a substrate surface, such as an autobody. After application, the layer is cured under ambient conditions or cure-baked at elevated temperatures to form a coating on the substrate surface having desired coating properties, such as high gloss, mar-resistance and resistance to environmental etching.

"One-pack coating composition" means a thermoset coating composition comprising two components that are stored in the same container. However, the crosslinker component is blocked to prevent premature crosslinking. After the application of the one-pack coating composition on a substrate, the layer is exposed to elevated temperatures to unmask the blocked crosslinker. Thereafter, the layer is bake-cured at elevated temperatures to form a coating on the substrate surface having desired coating properties, such as high gloss, mar-resistance and resistance to environmental etching.

"Low VOC coating composition" means a coating composition that includes less then 0.6 kilograms of organic solvent per liter (5 pounds per gallon) of the composition, as determined under the procedure provided in ASTM D3960.

"High solids composition" means a coating composition having solid component of above 40 percent, preferably in the range of from 45 to 87 percent and more preferably in the range of from 55 to 80 percent, all in weight percentages based on the total weight of the composition.

"GPC weight average molecular weight" means a weight average molecular weight measured by utilizing gel permeation chromatography (GPC). A high performance liquid chromatograph (HPLC) supplied by Hewlett-Packard, Palo Alto, Calif. was used. Unless stated otherwise, the liquid phase used was tetrahydrofuran and the standard was polymethyl methacrylate.

"Polydispersity" means GPC weight average molecular weight divided by GPC number average molecular weight.

"(Meth)acrylate" means acrylate and methacrylate.

"Polymer particle size" means the diameter of the polymer particles measured by using a Brookhaven Model BI-90

Particle Sizer supplied by Brookhaven Instruments Corporation, Holtsville, N.Y. The sizer employs a quasi-elastic light scattering technique to measure the size of-the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. in 1987 edition of American Chemical Society Symposium series.

"Polymer solids" or "Binder solids" means a polymer or binder in its dry state.

"Silanes" means the silicon compounds having the Si—C bond.

"Silicates" means the silicon compounds having the Si—O—C bond.

The present invention is directed to a low VOC curable coating composition that is particularly suited for use in automotive refinishing and OEM (original equipment manufacturer) process. The composition includes a binder in an organic solvent. The amount of organic solvent used results in the composition having a VOC of less than 0.6 kilogram (5 pounds per gallon), preferably in the range of 0.1 kilogram to 0.53 kilogram (1 pound to 4.4 pounds per gallon) and more preferably in the range of 0.1 kilogram to 0.4 kilogram (1 pound to 3 pounds per gallon) of an organic solvent per liter of the composition.

The binder includes a silicon/hydroxyl component and a crosslinking component. The silicon/hydroxyl component includes in the range of from 2 weight percent to 100 weight percent, preferably in the range of from 10 weight percent to 90 weight percent, more preferably in the range of from 20 weight percent to 80 weight percent and most preferably in the range of from 30 weight percent to 50 weight percent of the following:

I. A silicon/hydroxyl reactive oligomer having a linear or branched cycloaliphatic moiety and at least two functional groups. At least one of the groups is a silane or a silicate and the remaining groups are hydroxyl groups.

II. A silicon reactive oligomer having a linear or branched cycloaliphatic moiety and at least two functional groups being a silane, silicate or a combination thereof. The silicon reactive oligomer is blended with a hydroxy acrylic polymer, a hydroxy polyester, a silicon free reactive oligomer having a linear or branched cycloaliphatic moiety and at least two hydroxyl groups, or a combination thereof.

III. A combination of the aforedescribed I and II.

The silicon/hydroxyl reactive oligomer, silicon reactive oligomer and the silicon free reactive oligomer are all provided with a GPC weight average molecular weight not exceeding 4000, preferably in the range of from 300 to 4000, more preferably in the range of from 300 to 2500 and most preferably in the range of from 500 to 2000. Applicants have discovered that if the molecular weight of these reactive oligomers exceeds 4000, these reactive oligomers would become too viscous. As a result, larger amounts of solvent would be needed to produce a coating composition that can be sprayed by conventional spray coating devices. However, such a coating composition will not be a low VOC coating composition. Furthermore, the polydispersity of all of these reactive oligomers does not exceed about 1.7. Preferably, the polydispersity is in the range of from 1.01 to 1.7, more preferably in the range of from 1.01 to 1.5 and most preferably in the range of from 1.01 to 1.3. Applicants have discovered that if the polydispersity of these reactive oligomers exceeds 1.7, a coating composition which includes such a reactive oligomer would produce coating compositions that are too viscous for conventional spray coating devices.

Applicants have unexpectedly discovered that the presence of a linear or branched cycloaliphatic moiety in the silicon/hydroxyl reactive oligomer, silicon reactive oligomer and the silicon free reactive oligomer is critical for solubilizing of these reactive oligomers in a variety of organic solvents described below. The presence of the cycloaliphatic moiety also improves the miscibility of the multiple components of a coating composition and help maintain the film hardness of a coating resulting therefrom under normal use. All of these reactive oligomers are provided with at least one, preferably 1 to 6 and more preferably 1 to 4 cycloaliphatic rings. Some of the suitable cyclic moieties include 4 to 10 carbon atoms. Cyclohexane moiety is most preferred.

The silicon free reactive oligomer of the silicon/hydroxyl component is provided on an average in the range of from 2 to 10, preferably in the range of from 2 to 6 and more preferably in the range of from 2 to 4 with hydroxyl groups, which may be primary, secondary or a combination thereof. The primary hydroxyl group is a hydroxyl group positioned at the terminal end of the reactive oligomer. The higher the number of primary hydroxyl groups on the reactive oligomer, the higher will be its reactivity and the lower will be the cure temperature of the coating composition. Thus, the coating composition containing reactive oligomers provided with one or more primary hydroxyl groups would cure under ambient conditions.

The silicon free reactive oligomer of the present invention is produced by first reacting a multifunctional alcohol having a linear or branched cycloaliphatic moiety, such as, pentaeiythritol, hexandiol, trimethyol propane with alicyclic monomeric anhydrides, such as for example, hexahydrophthalic anhydride or methylhexahydrophthalic anhydride to produce an oligomeric acid. Mixtures of the foregoing anhydrides may also be used. Non-alicyclic anhrydides (linear or aromatic), such as for example, succinic anhydride or phthalic anhydride could also be added to the alicyclic monomeric anhydrides. Oligomeric acids having at least one hydroxyl functionality are also suitable. Such oligomeric acids are prepared. by reacting the multifunctional alcohol with less than a stochiometric amount of the monomeric anhydride.

The oligomeric acid is then reacted with a monofunctional epoxy, at a reaction gage pressure of less than 14 kg/cm$^2$ (200 psig), preferably at the reaction gage pressure in the range of from 0 kg/cm$^2$ to 2.1 kg/cm$^2$ (0 to 30 psig) to produce the reactive oligomer. The oligomerization is generally carried out at a reaction temperature in the range of from 60° C. to 200° C., preferably in the range of from 80° C. to 170° C., and more preferably in the range of from 90° C. to 150° C. Typical reaction time is in the range of from 1 hour to 24 hours, preferably from 1 hour to 4 hours.

The foregoing two-step process ensures that the hydroxyl functionalities are uniformly distributed on each oligomeric chain of the silicon free reactive oligomer.

The monofunctional epoxies suitable for use in the present invention include alkylene oxide of 2 to 12 carbon atoms. Ethylene, propylene and butylene oxides are preferred, ethylene oxide is more preferred. Other epoxies, such as, Cardura® E-10 glycidyl ester, supplied by Exxon Chemicals, Houston, Tex. may be used in conjunction with the monofunctional epoxies, described above.

Several methods are available for producing the silicon reactive oligomers.

For example, the silicon free reactive oligomers may be reacted with a stoichiometric amount of an isocyanato silane compound to replace all of the hydroxyl groups on the silicon free reactive oligomers with silane functionalities. If less than stoichiometric amount of the isocyanato silane compound is utilized, the resulting reactive oligomer will be the silicon/hydroxyl reactive oligomer having silane and hydroxyl functionalities. If a silicon free reactive oligomer having only two hydroxyl functionalities is used, then at least one of the hydroxyl groups is replaced with a silane functionality.

The foregoing method results in a silicon free reactive oligomer with silane functionalities of the following formula:

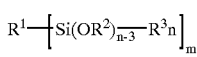

wherein $R^1$ is the remainder portion of the silicon free reactive oligomer, m as stated earlier varies in the range of from 2 to 10, $R^2$ is methyl or ethyl, $R^3$ is an alkyl or cycloalkyl radical having 1 to 10 carbon atoms and n is 0, 1 or 2. Some of the preferred silane compounds include isocyanato propyl trimethoxysilane.

Another suitable method for producing the silicon reactive oligomers having silane functionalities includes reacting the oligomeric acid having cycloaliphatic moiety with a stoichiometric amount of an epoxysilane, such as those supplied by WITCO Corporation of Friendly, W.Va. under the trademark A-186 Silane coupling agent of the formula β-(3,4-epoxycyclohexyl) ethyltrimethoxysilane. A-187 Silane coupling agent of the formula glycidyl propyltrimethoxysilane is also suitable. To prevent gelation. all of the acid groups have to be reacted with glycidylsilane molecule through the glycidyl group.

Still another suitable method for producing the silicon reactive oligomers having silane functionalities includes reacting oligomeric epoxies having a cycloaliphatic moiety with an aminosilane. Some of the suitable epoxies include Araldite® CY184 epoxy resins of the formula diglycidyl ester of 1,2-cyclohexane diacarboxylic acid supplied by Ciba Specialty Chemicals of Tarrytown, N.Y. and ERL-4221. ERL-4299 and ERL-4206 Cycloaliphatic epoxides supplied by Union Carbide of New York, N.Y. Some of the suitable aminosilanes include A-1100 Silane coupling agent having the formula gamma-arninopropyltriethoxysilane supplied by WITCO Corporation of Friendly, W.Va. A-1110 and A-1170 Silane coupling agents are also suitable.

The following method represents the reaction between the silicon free oligomer having hydroxyl functionalities with a silane compound for producing the silicon reactive oligomers having silicate functionalities:

wherein $R^1$ is the remainder portion of the silicon free reactive oligomer, m as stated earlier varies in the range of from 2 to 10, $R^2$ is methyl or ethyl, $R^3$ is an alkyl or cycloalkyl radical having 1 to 10 carbon atoms and n is 0, 1 or 2. Some of the preferred silane compounds include tetramethoxysilane and methyl trialkoxysilane, wherein the alkoxy groups contains 1 to 12 carbon atoms. Methyl trimethoxysilane is more preferred.

The silicon reactive oligomers having silane and silicate functionalities may be produced by reacting a polyol with a multifunctional silane.

The suitable polyol include simple diols. triols, and higher hydroxyl alcohols typically having a hydroxyl equivalent weight of about 30 to 1000, preferably from 50 to 500.

The simple diols, triols, and higher hydroxyl alcohols are generally known, examples of which include 2,3-dimethyl-2,3-butanediol (pinacol), 2,2-dimethyl-1-1,3-propanediol (neopentyl glycol), 2-ethyl-2-methyl-1,3-propanediol, 2,5-dimethyl-2,5-hexanediol, 1,4-butanediol, 1,6-hexanediol, 1,8-octanediol, 1,10-decanediol, 1,12-dodecanediol, 1,4-cyclohexanediol, 1,4-cyclohexanedimethanol, 4,4'-isopropylidenedicyclohexanol, 4,8-bis(hydroxyethyl) tricyclo[5.2.1.0]decane, 1,3,5-tris(hydroxyethyl)cyanuric acid (theic acid), 1,1,1-tris(hydroxymethyl)ethane, glycerol, pentaerythritol, sorbitol, and sucrose.

The multifunctional silanes include but are not limited to 1,2-bis(trimethoxysilyl)ethane, 1,6-bis(trimethoxysilyl) hexane, 1,8-bis(trimethoxysiyl)octane, 1,4-bis (trimethoxysilylethyl)benzene, bis(3-trimethoxysilylpropyl) amine, bis(3-trimethoxysilylpropyl)ethylenediamine, bis (trimethoxysilyl) derivatives of the following polyolefins: limonene and other terpines, 4-vinyl-1-cyclohexene, 5-vinyl-2-norbornene, norbomadiene, dicyclopentadiene, 1,5,9-cyclododecatriene, tris(trimethoxysilyl) derivatives of higher polyolefins, such as 1,2,4-trivinylcyclohexane. Examples of the substituted multifunctional silanes include but are not limited to bis and tris(trimethoxysilane) derivatives of polyunsaturated polyesters of the corresponding acids: trimellitic acid, cyclohexane dicarboxylic acids, 10-undecenoic acid, vinylacetic acid; and bis and tris (trimethoxysilane) derivatives of polyunsaturated polyethers of the corresponding polyols: 1,4-cyclohexanedimethanol, and 4,4'-isopropylidenedicyclohexanol. The multifunctional silane where a diol is reacted with bistrimethoxysilated adduct, described below, is preferred.

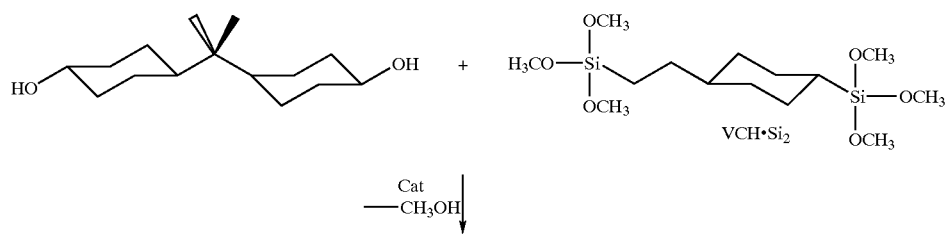

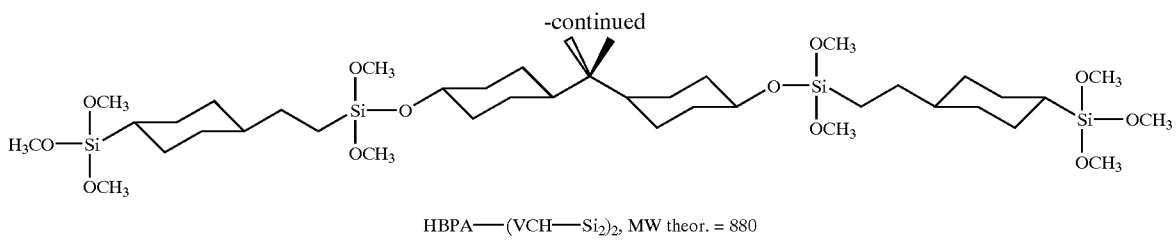

HBPA—(VCH—Si$_2$)$_2$, MW theor. = 880

Alternatively, the silicon reactive oligomer and the silicon/hydroxyl reactive oligomer may be prepared by reacting the aforedescribed silane compounds, or a combination thereof with the aforedescribed oligomeric alcohols, which contain cycloaliphatic moiety. Such oligomeric alcohols include cyclohexane dimethanol. The silicon/hydroxyl component of the binder of the present invention may be blended with non-alicyclic (linear or aromatic) oligomers, if desired. Such non-alicyclic-oligomers may be made by the aforedescribed process by using non-alicyclic anhydrides, such as succinic or phthalic anhydrides, or mixtures thereof. Caprolactone oligomers described in the U.S. Pat. No. 5,286,782 may be also used.

The hydroxy acrylic polymer, hydroxy polyester, the silicon free reactive oligomer or a combination thereof is blended in the range of from 0.1 percent to 95 percent, preferably in the range of from 10 percent to 90 percent, more preferably in the range of from 20 percent to 80 percent and most preferably in the range of from 50 percent to 70 percent, all based on the total weight of the silicon/hydroxyl component, with the silicon reactive oligomer of the silicon/hydroxyl component of the binder of the present invention. The hydroxy acrylic polymer and the silicon free reactive oligomer are preferred and the hydroxy acrylic polymer is more preferred. Applicants have discovered that by adding one or more of the foregoing component to the silicon/hydroxyl component, the coating composition resulting therefrom provides the coating with improved appearance, sag resistance, and flow and leveling properties.

If desired, the components described in the foregoing paragraph may be also blended with the silicon/hydroxyl reactive oligomer in the same proportions as those provided in the foregoing paragraph.

The hydroxy acrylic polymer has a GPC weight average molecular weight exceeding 3000, preferably in the range of from 3000 to 20,000, more preferably in the range of 6000 to 20,000, and most preferably in the range of from 8000 to 12,000. The Tg of the hydroxy acrylic polymer varies in the range of from 0° C. to 100° C., preferably in the range of from 30° C. to 80° C. The hydroxy acrylic polymer is provided on an average in the range of from 2 to 10, preferably in the range of from 2 to 6 and more preferably in the range of from 2 to 4, with functional groups. Of these functional groups, on an average at least one, preferably in the range of 1 to 4 and more preferably in the range of from 2 to 4 must be hydroxyl groups, the remainder of the groups are silane, silicate or a combination thereof. The foregoing average range may be attained by blendine hydroxy acrylic polymers having various numbers of functional groups.

The hydroxy acrylic polymer suitable for use in the present invention may be any conventional solvent soluble hydroxy acrylic polymer conventionally polymerized from typical monomers, such as alkyl (meth)acrylates having alkyl carbon atoms in the range of from 1 to 18, preferably in the range of from 1 to 12, styrene and hydroxy functional monomers, such as, hydroxy ethyl (meth)acrylates.

The hydroxy acrylic polymer may be reacted with less than stoichiometric amount of the silane compounds (described earlier), or a combination thereof to provide the hydroxy acrylic polymer with hydroxy, silane or silicate functionalities. Alternatively, the hydroxy acrylic polymer may be polymerized by including a monomer mix, silane-functional monomers, which include acrylate alkoxy silanes, such as gamma acryloxypropyltrimethoxy silane; methacrylatoalkoxy silanes, such as gamma-methacryloxypropyltrimethoxy silane, gamma trimethoxy silyl propyl methacrylate, and gamma trimethoxy silyl prepyl acrylate, and gamma-methacryloxypropyltris(2-methoxyethoxy) silane; vinylalkoxy silanes, such as vinyltrimethoxy silane, vinyltriethoxy silane and vinyltris(2-methoxyethoxy) silane; vinylacetoxy silanes, such as vinylmethyl diacetoxy silane, acrylatopropyl triacetoxy silane, and methacrylatopropyltriacetoxy silane; and combinations thereof. Gamma-methacryloxypropyltrimethoxy silane is preferred.

The hydroxy polyester suitable for use in the present invention may be a conventional hydroxy polyester having a GPC weight average molecular weight exceeding 1500, preferably in the range of from 1500 to 100,000, more preferably in the range of 2000 to 50,000, still more preferably in the range of 2000 to 8000 and most preferably in the range of from 2000 to 5000. The Tg of the hydroxy polyester varies in the range of from −50° C. to +100° C., preferably in the range of from −20° C. to +50° C.

The hydroxy polyester is conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form and as a mixture thereof. Examples of suitable polycarboxylic acids which, if desired, can be used together with the cycloaliphatic polycarboxylic acids are aromatic and aliphatic polycarboxylic acids, such as, for example, phthalic acid, isophthalic acid, terephthalic acid; halogenophthalic acids, such as, tetrachloro- or tetrabromophthalic acid; adipic acid; glutaric acid; azelaic acid; sebacic acid; fumaric acid; maleic acid; trimellitic acid; and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl)

isocyanate, polyethylene glycol and polypropylene glycol. If desired, monohydric alcohols, such as, for example, butanol, octanol, lauryl alcohol, ethoxylated or propoxylated phenols may be also included along with polyhydric alcohols. The details of the hydroxy polyester suitable for use in the present invention are further provided in the U.S. Pat. No. 5,326,820, which is incorporated herein by reference. One of the commercially available polyester, which is particularly preferred, is SCD®-1040 polyester, which is supplied by Etna Product Inc., Chagrin Falls, Ohio.

The hydroxy polyester may be reacted with less than stoichiometric amount of the silane compounds (described earlier), or a combination thereof to provide the hydroxy polyester with hydroxy, silane or silicate functionalities.

In addition to the forgoing components, the silicon/hydroxyl component of the binder of the present invention may further contain up to 40 percent, preferably in the range of from 5 percent to 35 percent, more preferably in the range of from 20 percent to 30 percent, all in weight percent based on the total weight of the binder of a dispersed acrylic polymer which is a polymer particle dispersed in an organic media, the polymer particle being emulsion stabilized by what is known as steric stabilization. Preferably, the polymer particle is provided with a core having macromonomer chains or arms attached to it. The preferred average particle size of the core is in the range of from 0.1 micron to 0.5 micron, preferably in the range of from 0.15 micron to 0.4 micron, more preferably in the range of from 0.15 micron to 0.35 micron.

The dispersed acrylic polymer includes in the range of from about 10 percent to 90 percent, preferably in the range of from 50 percent to 80 percent all in weight percent based on the weight of the dispersed polymer, of a core formed from high molecular weight polymer having a weight average molecular weight of 50,000 to 500,000, preferably in the range of from 50,000 to 200,000, more preferably in the range of from 50,000 to 150,000. The arms make up 10 percent to 90 percent, preferably 10 percent to 59 percent, all in weight percent based on the weight of the dispersed polymer. The arms are formed from a low molecular weight polymer having weight average molecular weight in the range of from 1,000 to 30,000, preferably in the range of from 3000 to 20,000, more preferably in the range of from 3000 to 15,000.

The core of the dispersed acrylic polymer includes polymerized acrylic monomer(s) optionally copolymerized with ethylenically unsaturated monomer(s). Suitable monomers include styrene, alkyl (meth)acrylate having alkyl carbon atoms in the range of from 1 to 18, preferably in the range of from 1 to 12; ethylenically unsaturated monocarboxylic acid, such as, (meth)acrylic acid, and silane-containing monomers. Other optional monomers include hydroxyalkyl (meth)acrylate or acrylonitrile. Optionally, the core may be crosslinked through the use of diacrylates or dimethacrylates, such as, allyl methacrylate or through post reaction of hydroxyl moieties with polyfunctional isocyanates.

The macromonomer arms attached to the core may be polymerized from monomers, such as alkyl (meth)acrylates having 1 to 12 carbon atoms. Typical hydroxy-containing monomers are hydroxy alkyl (meth)acrylates, described earlier.

The crosslinking component of the binder includes a blocked crosslinker or an unblocked crosslinker. The crosslinking component, which contains the unblocked crosslinker is stored separately from the silicon/hydroxyl component prior to application, i.e., a two-pack curable coating composition. These components are then mixed just before use. By contrast, the crosslinking component, which contains the blocked crosslinker is stored in the same container with the silicon/hydroxyl component, i.e.; a one-pack curable coating composition.

The unblocked or blocked crosslinker is an oligomeric crosslinker or a blend thereof. The unblocked or blocked crosslinker is provided with at least two isocyanate groups, such that the ratio of equivalents of isocyanate of the unblocked or blocked oligomeric crosslinker per equivalent of the hydroxyl of the silicon/hydroxyl component is in the range of from 0.3/1 to 3.0/1, preferably in the range of from 0.7/1 to 2/1, more preferably in the range of from 0.8/1 to 1.3/1.

Some of suitable unblocked oligomeric crosslinkers include aromatic, aliphatic, or cycloaliphatic isocyanates, triffunctional isocyanates and isocyanate functional adducts of a polyol and difunctional isocyanates. Some of the particular isocyanates include diisocyanates, such as 1,6-hexamethylene diisocyanate, isophorone diisocyanate, 4,4'-biphenylene diisocyanate, toluene diisocyanate, biscyclohexyl diisocyanate, tetramethylene xylene diisocyanate, ethyl ethylene diisocyanate, 1-methyltrimethylene diisocyanate, 1,3-phenylene diisocyanate, 1,5-napthalene diisocyanate, bis-(4-isocyanatocyclohexyl)-methane and 4,4'-diisocyanatodiphenyl ether.

Some of the suitable trifunctional isocyanates include triphenylmethane triisocyanate, 1,3,5-benzene triisocyanate, and 2,4,6-toluene triisocyanate. Trimers of diisocyanate, such as the trimer of hexamethylene diisocyante sold under the trademark Desmodur®N-3390 by Bayer Corporation of Pittsburgh, Pa., and the trimer of isophorone diisocyanate are also suitable. Furthermore, trifunctional adducts of triols and diisocyanates are also suitable. Trimers of diisocyanates are preferred and trimers of isophorone and hexamethylene diisocyantes are more preferred.

The blocked crosslinker has an isocyanate portion and a blocker portion. The isocyanate portion of the blocked crosslinkers are well-known in the art, and include toluene diisocyanates, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, triphenylmethane 4,4',4"-triisocyanate, tetramethyl xylene diisocyanate, metaxylene diisocyanate, and polyisocyanates. Groups suitable for use as the blocker portion of the blocked crosslinker are also well-known in the art, and include alcohols, lactarns, oximes, malonic esters, alkylacetoacetates, triazoles, pyrazoles (e.g. dimethyl pyrazole), phenols and anines. Of these, oximes (e.g., acetone oxime, methyl ethyl ketoxime, methylamyl ketoxime) are preferred. Most preferably, the blocked isocyanate is the isocyanurate of 1,6-hexamethylene diisocyanate, wherein the blocker portion is an oxime (e.g., acetone oxime, methylethyl ketoxime, methylamyl ketoxime) or a pyrozole (e.g. dimethyl pyrazole). Some of the commercial examples of blocked isocyanate include BL 3175 MEKO blocked HDI isocyanurate trimer and BL 4165, MEKO blocked IPDI isocyanurate trimer both supplied by Bayer Corporation of Pittsburgh, Pa. Another suitable commercial blocked isocyanate is BI 7982, 3,5-dimethyl pyrazole blocked HDI isocyanurate trimer supplied by Baxenden Chemicals Ltd., Lancashire, England.

The crosslinking component may optionally include in the range of from 0.1 percent to 30 percent, preferably in the range of from 5 percent to 25 percent, more preferably in the range of from 10 percent to 20 percent, all in weight percentages based on the total weight of binder solids, of the following one or more additional crosslinkers.

Aldimine oligomers which are the reaction products of alkyl aldehydes, such as isobutyraldehyde, with diamines, such as isophorone diamine. Ketimine oligomers which are the reaction product of alkyl ketones, such as methyl isobutyl ketone, with diamines, such as 2-methyl pentamethylene diamine. Polyaspartic esters, which are the reaction product of diamines, such as isopherone diamine, with dialkyl maleates, such as diethyl maleate. All of the foregoing additional crosslinkers are well known, including those supplied under the trademark Desmopheno® amine co-reactants by Bayer Corporation, Pittsburgh, Pa. Melamine-fomaldehyde resins, such as CYMEL® 300, 303, 350, 1156, 1168 and 325 Resins supplied by Cytec Industries of West Patterson, N.J. are suitable. Epoxies, such as Araldite® CIY 184 epoxy resins from Ciba Specialty Chemicals of Tarrytown, N.Y. and DCE 358 Epoxy Resin from Dixie Chemicals in Texas.

The crosslinking component of the binder preferably includes a catalytic amount of a catalyst for accelerating the curing process. The catalytic amount depends upon the reactivity of the hydroxyl group of the reactive oligomer present in the silicon/hydroxyl component of the binder. Generally, in the range of 0.001 percent to 5 percent, preferably in the range of from 0.01 percent to 2 percent, more preferably in the range of from 0.02 percent to 1 percent, all in weight percent based on the total weight of binder solids, of the catalyst is utilized. A wide variety of catalysts can be used, such as, tin compounds, including dibutyl tin dilaurate; tertiary amines, such as, triethylenediarnine. These catalysts can be used alone or in conjunction with volatile carboxylic acids, such as acetic acid. Other acid catalysts, such as dodecylbenzene sulfonic acid and phenyl acid phosphate may be also used as catalyst to accelerate cure with the silane compounds. The dodecylbenzene sulfonic acid may be optionally blocked with amines, such as aminomethylpropanol. One of the commercially available catalyst sold under the trademark, Fastcat® 4202 dibutyl tin dilaurate by Elf-Atochem North America, Inc. Philadelphia, Pa., is particularly suitable.

The coating composition of the present invention, which is formulated into a high solids coating system, further contains at least one organic solvent which is typically selected from the group consisting of aromatic hydrocarbons, such as, petroleum naphtha or xylenes; ketones, such as methyl amyl ketone, methyl isobutyl ketone, methyl ethyl ketone or acetone. esters, such as butyl acetate or hexyl acetate; and glycol ether esters, such as propylene glycol monomethvl ether acetate. The amount of organic solvent added depends upon the desired solids level as well as the desired amount of the VOC in the composition. The organic solvent may be added to either or both of the components of the binder.

The coating composition of the present invention may also contain conventional additives, such as, pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating. The foregoing additives may be added to either the silicon/hydroxyl or crosslinking components, or both, depending upon the intended use of the coating composition. These additives are preferably added to the silicon/hydroxyl component.

The silicon/hydroxyl and crosslinking components, when formulated as a two-pack coating composition for OEM application, are mixed in in-line mixers just prior to use. Alternatively, the components are mixed about 5 to 30 minutes before use to form a pot mix, which has a limited pot life. A layer of the pot mix is typically applied to a substrate by conventional techniques, such as, spraying, electrostatic spraying, roller coating, dipping or brushing. Depending on the type of hydroxyl functionalities included in the silicon/hydroxyl component (primary versus secondary), the layer of the coating composition is then cured under ambient conditions (the silicon/hydroxyl component includes at least one primary hydroxyl functionality) in 30 minutes to 24 hours, preferably in 30 minutes to 3 hours to form a coating on the substrate having the desired coating properties. It is understood that the actual curing time depends upon the thickness of the applied layer and on any additional mechanical aids, such as fans or blowers that provide continuous air flow over the coated substrate to accelerate the cure rate. If desired, the cure rate may be further accelerated by baking the coated substrate at temperatures generally in the range of from 60° C. to 150° C. for a period of 15 minutes to 90 minutes.

If the silicon/hydroxyl component includes all secondary hydroxyl functionalities, then the layer of the pot mix, as described above, is bake-cured at a bake temperature in the range of from 100° C. to 150° C. for a period of 90 minutes to 15 minutes. The foregoing baking step is particularly useful under OEM conditions.

A layer of the one-pack coating composition is typically applied to a substrate by conventional techniques, such as, spraying, electrostatic spraying, roller coatings dipping or brushing. The layer of the one-pack coating composition is bake-cured at a bake temperature in the range of from 100° C. to 150° C. for a period of 90 minutes to 15 minutes. The foregoing baking step is particularly useful under OEM conditions.

The coating compositions of the present invention are particularly useful as a clear coating for outdoor articles, such as automobile and other vehicle body parts. The substrate is generally prepared with a primer and or a color coat or other surface preparation prior to applying the coating of the present composition.

EXAMPLES

Test Procedures

The following test methods were used:

Gardner-Holdt Viscosity was measured under ASTM test D1545.

The Zahn 2 viscosity in seconds was measured using the Zahn 2 cup. The viscosity was also measured by using #4 Ford Cup supplied by Gardener Instruments of Fort Lauderdale, Fla.

The dry time of a coated layer of the composition was measured as BK3 surface dry time under ASTM D5895.

Field Etch Resistance was measured by exposing coated test panels at a test facility in Jacksonville, Fla. for 14 weeks during the summer. Comparisons were made to standard melamine coated panels. A visual scale of 1 to 12 was used to determine etch resistance, with 12 being worst (melamine coatings are typically rated at 10 to 12) and 1 being the best.

Laboratory Etch Resistance was measured by coating black basecoated panels with a clear coating composition and then subjecting the coated panels to a temperature gradient in a gradient oven, such that the surface temperatures on the coated panel ranged from 45° C. to 85° C. The panels were then spotted (200 microliter) with a 1 pH acid solution along the gradient. After a 30 minute exposure, the spots were washed off with deionized water. The lowest temperature (°C.) at which etching occurred on the panel surface was noted.

The degree of cure of a coating from the coating composition was measured by subjecting it to methyl ethyl ketone (MEK), which is a strong solvent. Poorly cured (crosslinked) coatings tend to be sensitive to MEK and are severely marred (or removed) by rubbing with MEK. The MEK Rub Test was conducted using the following procedure:

1. A linen cloth was saturated with MEK.
2. The coated test panel was rubbed with the MEK soaked cloth back and forth for 100 cycles using moderate digital pressure.
3. The appearance of the coating was rated after the 100 cycles. A panel rating of 10 means no visible damage was seen on the coating and a panel rating of 1 means the coating was completely removed from the underlying substrate. If the coating was completely removed before 100 cycles, the number of cycles to remove the coating was noted.
4. The cure rating was reported as # of cycles multiplied by the panel rating. Thus, the best cure rating would be 1000. Acceptable minimum cure rating is 700.

20 Degree Gloss of the cured coating was measured on a Hunter Lab Progloss Unit, Model # PG-3, supplied by Hunter Laboratories of Windsor, Conn. A reading of 70 and above was considered acceptable.

Distinctness of Image of the cured coating was measured on a Hunter Lab—Model Dorigon II, supplied by Hunter Laboratories of Windsor, Conn. A reading of 70 and above was considered acceptable.

The Hardness of the cured coating was measured in Newtons per quare millimeter, using a Fischerscope® Hardness Tester Model # HM100V, supplied by Fischer Technologies Inc. of Reston, Va. A reading of 60 and above was considered acceptable.

The Tukon Hardness of the cured coating was measured under ASTM Method is E384 by using. Wilson Tukon Tester supplied by Instron Corporation of Canton, Mass. A rating of 7 and above was considered acceptable.

The Swell Ratio of the coating was determined by swelling a free test film of the coating in methylene chloride. The free film was placed between two layers of aluminum foil and using a LADD punch, a disc of about 3.5 mm diameter was punched out of the film. The aluminum foil was removed from either side of the free film. Using a microscope with 10× magnification and a filar lens, the unswollen diameter ($D_O$) of the film measured. Four drops of methylene chloride were then added to the film, the film was allowed to swell for a few seconds and then a glass slide was placed over it. The diameter was re-measured ($D_S$). The swell ratio was then calculated as:

Swell ratio=$(D_S)^2/(D_O)^2$

The Swell ratio indicates the degree of crosslinking attained in the cured coating. A swell ratio of 2.1 and below was considered acceptable.

The Wet Mar Resistance of the coating was measured by marring the coating with a felt pad soaked in a 3% slurry of aluminum oxide in water. The marring was accomplished using a Daiei® Rub Tester. The test used 10 cycles with a weight of 500 grams. The rating, as measured by image analysis, is the percent of the surface that remained unmarred. A reading of 60 and above was considered acceptable.

The Dry Mar Resistance of the coating was measured by marring the coating with a felt pad coated with Bon Ami® cleanser. The marring was accomplished using a Daiei® Rub Tester. The test used 15 cycles with a weight of 700 grams. The rating, as measured by image analysis, is the percent of the surface that remained unmarred. A reading of 60 and above was considered acceptable.

The Crockmeter Wet Mar Resistance of the coating was measured by using a AATCC Crockmeter, Model CM1 (Atlas Electric Devices Co). The coated panel was placed flat on the base of the Crockmneter. The finger of the Crockmeter was covered with a felt pad (Atlas part# 14-9956-00). The abrasive was spread generously on the panel, which was then tapped on edge to remove excess material. The felt pad was moved back and forth across the panel 10 times. The abrasive was a slurry of aluminum oxide placed on the panel directly below the felt pad covered finger. The slurry included 85% DI water. 6% ASE-60 thickener supplied by Rohm and Haas Company, Philadelphia, Pa., 7% 2-amino-2-methyl-1-propanol and 2% aluminum oxide #120.

The Crockmeter Dry Mar Resistance was measured through the same process as described above except the slurry was replaced with an abrasive known as Bon-Ami® cleanser, supplied by Faultless Starch/Bon Ami Company. The Crocker Wet and Dry Mar resistance in percentages was reported by measuring the 20° gloss of the marred area of the panel before and after the test.

Procedure 1

Tetra Hydroxyl Functional Silicon Free Reactive Oligomer Preparation of Oligomeric Acid-Procedure 1A To a 12-liter flask fitted with an agitator, condenser, heating mantle, nitrogen inlet, thennocouple and an addition port, 2447.2 g of propylene glycol monomethylether acetate, 792.4 g of pentaerythritol and 1.36 g of triethylamine were added. The reaction mixture was heated with agitation to 140° C. under a nitrogen blanket. Then, 3759 g of methyl hexahydrophthalic anhydride was added over a period of 6 hours. The reaction mixture was held at 140° C. until no anhydride bands were observed on an infrared spectroscopic trace.

Preparation of Tetra-Hydroxy Functional Silicon Free Reactive Oligomer-Procedure 1B To a 5-liter flask fitted with an agitator, condenser, heating mantle, nitrogen inlet, thermocouple and an addition port, 2798.4 g of oligomeric acid prepared under Procedure-1A above and 2.76 g of triethylamine were added. The mixture was heated with agitation to 60° C. under nitrogen. Then, 696.9 g of 1,2-epoxy butane was added over 120 minutes. The reaction temperature was then raised to 105° C. and held at that temperature until the acid number dropped to about 10 or less. The percent solids of the of the resulting tetra hydroxyl functional silicon free reactive oligomer was 71.5, Gardner viscosity was V, the number average molecular weight was 895 and the weight average molecular weight was 1022, both determined by GPC (polystyrene standard).

Procedure 2

Pentaerythritol Based Hydroxy Silicon Free Reactive Oligomer

The following ingredients all in parts by weight were charged to a vessel rated for high pressure and heated to 140° C.

| | |
|---|---|
| propylene glycol monomethyl ether acetate | 565 |
| pentaeryhritol | 136 |
| triethylamine | 0.23 |

The following ingredient was then added to the reactor over a one hour period and then the batch was held at 140° C. for 6 hours.

| | |
|---|---|
| methyl hexahydrophthalic anhydride (Milldride ® MHHPA from Milliken Chemical) | 645.12 |

The batch was cooled to 25° C., the vessel was sealed after adding the following ingredient and the batch was then heated to 110° C. and held at 110° C. for 6 hours.

| | |
|---|---|
| ethylene oxide | 260.4 |

Excess ethylene oxide was removed by purging the batch with nitrogen. The acid number on solids was tested at less that 10 mg KOH/gram. The batch was cooled and filled out. The percent solids of the resulting reactive oligomer was 64.8. The Gardner-Holdt viscosity was H+1/4.

Procedure 3

Di Hydroxyl Functional Silicon Free Reactive Oligomer Preparation of Oligomeric acid-Procedure-3A To a 12-liter flask fitted with an agitator, condenser, heating mantle, nitrogen inlet, thermocouple and an addition port, 2434.5 g of propylene glycol monomethylether acetate, 1222.5 g of hexane diol and 1.37 g of triethylamine were added. The reaction mixture was heated with agitation to 140° C. under a nitrogen blanket and then 3341.6 g of methyl hexahydrophthalic anhydride was added over a 6 hour period. The reaction mixture was then held at 140° C. until no anhydride bands were observed on an infrared spectroscopic trace.

Preparation of Oligomeric Diol-Procedure-3B

To a 5-liter flask fitted with an agitator, condenser, heating mantle, nitrogen inlet, thermocouple and an addition port, 2020.4 g of oligomeric acid prepared under Procedure-3A above and 2.45 g of triethylamine were added. The mixture was heated with agitation to 60° C. under nitrogen. Then, 478.3 g of 1,2-epoxy butane was added over a two hour period. Thereafter, the temperature was raised to 105° C. and held at that temperature until the acid number dropped to about 10 or less. The resulting oligomeric diol had percent solids at 69.5, Gardner viscosity at A, the number average molecular weight at 679 and the weight average molecular weight at 770, as determined by GPC (polystyrene standard).

Procedure 4

Silicon Reactive Oligomer (Silanated 4-vinyl-1-cyclohexene)

A 2-neck 100 ml round-bottom flask was equipped with a magnetic stirring bar, heating mantle, solids addition funnel, and condenser. The condenser was fitted with a Claisen adapter and a polytetrafluoroethylene-clad thermocouple was inserted through the Claisen adapter and condenser to reach the liquid layer of the flask. The other arm of the Claisen adapter was connected to a 50 ml liquid addition funnel fitted with a Dewar condenser. The entire assembly was purged with nitrogen prior to the reaction and a positive pressure of nitrogen was maintained during the reaction.

The round bottom flask was charged with 4-vinyl-1-cyclohexene (22 g, 0.20 mole). The solids addition funnel was charged with 3 g of Vazot® Initiator supplied by the DuPont Company, Wilmington, Del. The liquid addition funnel was charged with trichlorosilane (57 g, 0.42 mole). The condenser on the flask and the condenser on the solids addition funnel were cooled to −10° C. The flask contents were heated with stirring to 90° C. Then enough trichlorosilane was added to bring the flask temperature down to about 85° C. Small quantities of Vazo®64 Initiator supplied by the DuPont Company, Wilmington, Del. were added intermittently. The reaction temperature was maintained between 85–95° C. by adding trichlorosilane and small amounts of initiator as needed.

Excess trichlorosilane in the reaction mixture was evaporated by passing nitrogen over the reaction mixture and by recondensing trichlorosilane in the liquid addition funnel. At this point, the reaction temperature was allowed to rise to 125° C., then held for 1 hour. The total reaction time was 15 hours. The reaction mixture was then cooled to ambient temperature and the product isolated by standard inert atmosphere techniques. After isolation, the GC analysis indicated that the vinylcyclohexene was consumed to produce a monosubstituted product (4-(2-trichlorosilylethyl) cyclohex-1-ene) and isomers thereof and a distributed product (4-(2-trichlorosilylethyl)-1-trichlorosilylcyclohexane) and isomers thereof. Bis(trimethoxysilylated) product (4-VCHSi$_2$) was obtained by a conventional methoxylation of the reaction mixture and isolated by a vacuum distillation.

4-VCH-Si$_2$/HBPA Silicon Reactive Oligomer Having Silane and Silicate Functionalities In a five-liter flask equipped with a magnetic stirrer, Vigreux fractional distillation head under nitrogen blanket, hydrogenated bisphenol A HBPA (700 g 2.91 mole), 4-VCH-Si$_2$ (2400 g, 6.82 mole), Nafion® NR-50 (100 g), and trifluoroacetic acid (TFAA, 5 g) were heated to 100–120° C. In about 6 hours, the pot temperature increased from 105 to 119° C. and about 240 ml MeOH was collected. The resulting crude product had a viscosity of 12 poise, color a=1.3, b=+6.4. The crude product was diluted with about 500 ml of hexane, filtered through a multilayer system composed of: a Whatman 50 filter paper; silica gel desiccant, grade 12; silica gel 60; and decolorizing carbon, Norit® 211. Volatiles were removed in 1 hour at 75° C. under vacuum (20 Torr) on a rotary-evaporator. The resulting oligomer weighed 2700 g, which had a viscosity of 15 poise, Mn=1750, polydispersity of 1.45 (by MALDI MS), color a=−0.79, b=+3.8.

Procedure 5

Silicon/Hydroxyl Reactive Oligomer (Containing Silane Functionality)

The following ingredients in grams were mixed and heated at 60° C. for 48 hours.

| | |
|---|---:|
| di-hydroxyl functional oligomer(from Procedure 3) | 250 |
| isocyanato propyl trimethoxysilane | 60.9 |
| 1% dibutyl tin dilaurate in methyl ethyl ketone | 0.25 |

Procedure 6

Silicon/Hydroxyl Reactive Oligomer (Containing Silane Functionality)

Cyclohexanedimethanol was melted in a laboratory oven and 294.7 g of melted cyclohexanedimethanol along with 0.11 g dibutyl tin dilaurate were placed in a flask at about 35° C. Then over a period of 75 minutes, 419.5 g of isocyanato-propyltrimethoxysilane was added to the reaction mixture. The reaction mixture was then held for two hours and cooled.

Procedure 7

Hydroxy Acrylic Polymer

Hydroxy Acrylic Polymer was

The following components (I) in parts by weight were loaded in a reactor after purging the reactor with nitrogen and heated to reflux under nitrogen to 150° C. to 155° C.

| (I) | |
|---|---:|
| Aromatic hydrocarbon solvent | 233.810 |
| Propylene glycol monomethyl ether acetate | 53.640 |
| Xylene | 56.670 |

The following components (II) in parts by weight were added in the order reported to a monomer feed tank and mixed for 10 minutes. The components (II) were fed through a dip tube to the reactor, simultaneously with components (III) described below in about 300 minutes. The reactor was maintained under reflux with minimum heat.

| (II) | |
|---|---:|
| Styrene (Sty) | 136.540 |
| Butyl methacrylate (BMA) | 234.850 |
| Hydroxy ethyl acrylate (HEA) | 174.770 |

The dip tube was rinsed with 4.940 parts in weight of aromatic hydrocarbon solvent before the completing the feed of the components (III) described below.

The following components (III) in parts by weight were added in the order reported to a initiator feed tank and mixed for 10 minutes. The components (III) were fed through a dip tube to the reactor, simultaneously with components (II) described above in about 330 minutes. The reaction temperature was then maintained at reflux for 30 minutes.

| (III) | |
|---|---:|
| 75% t-butyl peroxy acetate in mineral spirits | 24.180 |
| Aromatic hydrocarbon | 20.760 |
| Xylene | 15.940 |
| Propylene glycol monomethyl ether acetate | 14.170 |

The dip tube was rinsed with 1.970 parts by weight of propylene glycol monomethyl ether acetate through dip tube. The reaction mixture was then maintained under heat to strip off 117.24 parts by weight of the reaction mixture. The reaction mixture was then cooled to below 80° C. The resulting yield was 855 parts by weight of a hydroxy acrylic polymer having a composition of STY/BMA/HEA (25/43/32) @ 66 percent solids. The polymer viscosity was measured at X-Z in a Gardner-Holdt Tube.

Procedure 8

Hydroxy Acrylic Polymer with Silane Functionality

A solution hydroxy acrylic polymer was prepared by copolymerizing 108 parts of a mixture of monomer/initiator (20 parts styrene, 30 parts hydroxyethyl methacrylate, 10 parts gamma-methacryloxypropyl trimethoxy silane, 28 parts isobutylmethacrylate, 12 parts ethylhexylacrylate, and 8 parts Vazo®67 Initiator supplied by the DuPont Company, Wilmington, Del.) in 60 parts of a refluxing mixture of 2/1 Aromatic 100/n-butanol solvent. The resulting resin solution was @ 66 percent solids, had a Gardner-Holt viscosity of X+, and a Mw of 5 100 as determined by GPC.

Procedure 9

Polybutyl Acrylate

Polybutyl acrylate was prepared by adding 100 parts n-butyl acrylate and 1.4 parts of t-butyl perbenzoate, evenly, to 67 parts of refluxing xylene over a 2 hour period.

Procedure 10

Hydroxy Acrylic Polymer

An hydroxy acrylic polymer solution was prepared by copolymerizing 104 parts of a mixture of monomer/initiator (25 parts styrene, 32 parts hydroxyethylacrylate, 43 parts n-butyl methacrylate, 4 parts Vazo®67 Initiator supplied by the DuPont Company, Wilmington, Del.) in 60 parts of a refluxing mixture of 9/1 aromatic 100/n-butyl acetate solvent. The resulting polymer was @ 66 percent solids, had a Gardner-Holt viscosity of Y-, and a Mw of 5300 as determined by GPC.

The following curable coating composition were made by using the aforedescribed ingredients:

Example 1

A two-pack clear coating composition was prepared by using the following components in grams:

| Silicon/hydroxyl Component | |
|---|---:|
| tetra hydroxyl oligomer (from Procedure 1) | 243.51 |
| silcon/hydroxyl oligomer (from Procedure 5) | 175.89 |
| Tinuvin ® 384 (UV Screener from Ciba Geigy) | 9.74 |
| Tinuvin ® 292 (hindered amine light stabilizer from Ciba Geigy) | 6.97 |
| 10% BYK ® 301 (flow additive from BYK Chemie in propylene glycol monomethyl ether acetate) | 3.29 |
| 10% dibutyl tin dilaurate in butyl acetate | 1.04 |
| butyl acetate | 26.31 |
| propylene glycol monomethyl ether acetate | 26.31 |

-continued

| Crosslinking Component: | |
|---|---|
| Tolonate HDT ® (isocyanurate trimer of hexamethylene diisocyanate from Rhodia, Inc. of Cranbury, New Jersey) | 157.21 |

The two components were mixed to form a pot mix, which was sprayed to cast a layer over a black waterborne basecoat that had received a warm air flash for 5 minutes @ 82° C. (180° F.). The layer was cured for 30 minutes at 146° C. (295° F.) to form a coating having a dry film thickness of 51 microns (2 mil).

Example 2

A two-pack clear coating composition was prepared by using the following components in grams:

| Silicon/hydroxyl Component | |
|---|---|
| Tetra hydroxyl oligomer (from Procedure 1) | 156.25 |
| Di-hydroxyl functional oligomer (from Procedure 3) | 158.27 |
| Silicon/Hydroxyl Reactive Oligomer (from Procedure 6) | 42.28 |
| Tinuvin ® 384 (UV screener from Ciba Geigy) | 8.46 |
| Tinuvin ® 292 (hindered amine light stabilizer from Ciba Geigy) | 6.25 |
| 10% BYK ® 301 (flow additive from BYK Chemie in propylene glycol monomethyl ether acetate) | 4.23 |
| 1% dibutyl tin dilaurate in methyl ethyl ketone | 16.54 |
| butyl acetate | 27.58 |
| Propylene glycol monomethyl ether acetate | 27.57 |
| Crosslinking Component: | |
| Tolonate HDT ® (isocyanurate trimer of hexamethylene diisocyanate from Rhodia, Inc. of Cranbury, New Jersey) | 152.57 |

The two components were mixed to form a pot mix, which was sprayed to cast a layer over a black waterborne basecoat that had received a warm air flash for 5 minutes @ 82° C. (180° F.). The layer was cured for 30 minutes at 140° C. (285° F.) to form a coating having a dry film thickness of 51 microns (2 mil).

Example 3

A two-pack clear coating composition was prepared by using the following components in grams:

| Silicon/hydroxyl Component | |
|---|---|
| Pentaerythritol based hydroxyl oligomer (from Procedure 2) | 24.5 |
| Butyl acetate | 13.0 |
| 10% BYK ® 301 (flow additive from BYK Chemie in propylene glycol monomethyl ether acetate) | 0.36 |
| 1% dibutyl tin dilaurate in methyl ethyl ketone | 1.8 |
| 75% phenyl acid phosphate in butanol | 0.60 |
| Silicon reactive oligomer (from Procedure 4) | 4.52 |
| Crosslinking Component: | |
| Tolonate HDT ® (isocyanurate trimer of hexamethylene diisocyanate from Rhodia, Inc. of Cranbury, New Jersey) | 15.71 |

The two components were mixed to form a pot mix, which was cast using a drawdown bar over glass and primed panels. The layer was cured for 30 minutes at 140° C. (285° F.) to form a coating having a dry film thickness of 51 microns (2 mil).

Example 4

A two-pack clear coating composition was prepared by using the following components in grams:

| Silicon/hydroxyl Component | |
|---|---|
| Tetra hydroxyl oligomer (from Procedure 1) | 8.4 |
| Di-hydroxyl functional oligomer (from Procedure 3) | 8.6 |
| Hydroxy acrylic polymer (from Procedure 7) | 4.5 |
| Silicon/Hydroxyl Reactive Oligomer (from Procedure 6) | 2.9 |
| 10% BYK ® 301 (flow additive from BYK Chemie in propylene glycol monomethyl ether acetate) | 0.25 |
| 1% dibutyl tin dilaurate in methyl ethyl ketone | 0.75 |
| Butyl acetate | 5.0 |
| Crosslinking Component: | |
| Tolonate HDT ® (isocyanurate trimer of hexamethylene diisocyanate from Rhodia, Inc. of Cranbury, New Jersey) | 9.7 |

The two components were mixed to form a pot mix, which was cast using a drawdown bar over primed panels. The layer was cured for 30 minutes at 140° C. (285° F.) to form a coating having a dry film thickness of 51 microns (2 mil).

Example 5

A two-pack clear coating composition was prepared by using the following components in grams:

| Silicon/hydroxyl Component | |
|---|---|
| Silicon free reactive oligomer (from Procedure 2) | 20.38 |
| Silicon reactive oligomer (Procedure 5) | 17.06 |
| 10% BYK ® 301 (flow additive from BYK Chemie in propylene glycol monomethyl ether acetate) | 0.40 |
| 1% dibutyl tin dilaurate in methyl ethyl ketone | 2.0 |
| Butyl acetate | 6.61 |
| Crosslinking Component: | |
| Tolonate HDT ® (isocyanurate trimer of hexamethylene diisocyanate from Rhodia, Inc. of Cranbury, New Jersey) | 13.55 |

The two components were mixed to form a pot mix, which was cast using a drawdown bar over glass and primed panels. The layer in one set (Set 1) was cured for 30 minutes at 140° C. (285° F.) to form a coating having a dry film thickness of 51 microns (2 mil). The layer in the other set (Set 2) was allowed to cure under ambient conditions to form a coating having a dry film thickness of 5 microns (2 mil).

The coatings from the foregoing Examples were tested for their hardness, appearance (gloss and distinctness of image), mar resistance (wet and dry), etch resistance and cure quality. The results are indicated in Table 1 below:

TABLE 1

| Test | Ex.1 | Ex.2 | Ex.3 | Ex.4 | Ex.5 Set 1 | Ex.5 Set 2 |
|---|---|---|---|---|---|---|
| Appearance | | | # | | | |
| 20° Gloss | 98 | | | | 85 | |
| Distinctness of Image | 98 | 98 | | | | |
| Fischer Hardness | 120 | 93 | 140 | 111 | 136 | 25*** |
| | | | | | | 132** |
| Mar Resistance | | | | | | |
| Dry | 98.5 | 99* | | | | |
| Wet | 86 | 94* | | | | |
| Etch Resistance | 6 | 8 | | | | |
| MEK Cure | | | 850 | 900 | | |
| Swell Ratio | | | | | 1.78 | 1.76** |
| BK3 Dry Time in minutes | | | | | | 354 |

*Reading after heating the marred panel for 1 hour @70° C.
No visual haze was observed.
***Measured after 24 hours (Coated panels cured @ 25° C. and 50% relative humidity).
**Measured after 30 days (Coated panels cured @ 25° C. and 50% relative humidity).

From Table 1 it is seen that Examples 1 through 5 demonstrate that clear coating compositions of the present invention exhibit excellent mar and etch resistance, appearance and a high degree of cross linking.

Applicants have unexpectedly discovered that by using silicon/hydroxyl component in a curable coating composition, the application viscosity (in-can viscosity) at lowered VOC content can be reduced substantially while still increasing the solids level of the coating composition. Applicants have also unexpectedly discovered that the presence of silicon containing functionalities in the reactive oligomers of the silicon/hydroxyl component of the coating composition permits one to increase the number of functionalities added to the reactive oligomer, thereby increasing the crosslinking ability of the coating composition without increasing its viscosity even at high solids level. These results are shown in Table 2 below:

TABLE 2

| Reactive Oligomer | Functionality | Viscosity* | Viscosity per Functionality* |
|---|---|---|---|
| Oligomer #1 (Hydroxyl) | 4 | 4030 | 1007.5 |
| Oligomer #2 (Hydroxyl) | 2 | 852 | 426 |
| Oligomer #1 (Silane) | 6 | 250 | 41.67 |
| Oligomer #2 (Silane) | 10 | 100 | 10 |

*Measured in CPS using Brookfield Viscometer at 100 RPM
Oligomer #1 (Hydroxyl) Pentaerythritol (PE) based hydroxyl oligomer (from Procedure #2). Final composition was PE/MHHPA/EO-1/4/4 on a mole basis) @ 80% Wt solid in methyl amyl ketone.
Oligomer #2 (Hydroxyl) Cyclohexanedimethanol (CHDM) based hydroxyl oligomer (similar to Procedure #2 with CHDM replacing PE). Final composition was CHDM/MHHPA/EO-1/2/2 on a mole basis) @ 80% Wt solid in methyl amyl ketone.
Oligomer #1 (Silane) CHDM/Silane Oligomer described in Procedure 6 @ 80% Wt solid in methyl amyl ketone.
Oligomer #2 (Silane) Silane/silicate oligomer of Procedure #4 @ 80% Wt solid in methyl amyl ketone.

From Table 2 it is readily seen that the silane/silicate oligomers provide, even at lowered application viscosities and VOC content, highly crosslinked systems as compared to those containing hydroxyl oligomers.

Examples 6 and 7

A two-pack clear coating compositions were prepared by using the following components in parts by weight:

| | Example 6 | Example 7 |
|---|---|---|
| Silicon/hydroxyl Component | | |
| Hydroxy acrylic polymer (prepared under Procedure 8) | 78.5 | 78.5 |
| Reactive oligomer I | 25.3 | |
| Reactive oligomer II | | 25.3 |
| UVA/HALS Solution 1* | 10.0 | 10.0 |
| Polybutyl Acrylate polymer (prepared under Procedure 9) | 0.8 | 0.8 |
| Dodecylbenzene sulfonic acid solution** | 3.0 | 3.0 |
| Aromatic 100 solvent | 17.0 | 10.0 |
| Ethyl 3-ethoxy propionate | 17.0 | 10.0 |
| Crosslinking Component: | | |
| 83% Solution of Tolonate ® HDT-LV (isocyanurate trimer of hexamethylene diisocyanate from Rhodia, Inc. of Cranbury, New Jersey) | 27.6 | 27.6 |
| Aromatic 100 solvent | 2.8 | 2.8 |

*UVA/HALS Solution 1 is 70% Aromatic 100, 20% Tinuvin ® 928 and 10% Tinuvin ® 152 supplied by Ciba Specialty Chemicals Corp.
**A solution of dodecylbenzenesulfonic acid (33%) neutralized with 2-aminomethyl propanol in butanol.
Reactive oligomer I was the reaction product of two moles of isocyanatopropyl trimethoxysilane with one mole of cyclohexanedimethanol (as in Procedure 6).
Reactive Oligomer II was the adduct of 1,2,4-trivinyl cyclohexane with three moles of trimethoxy silane.

The two respective components of Examples 6 and 7 were mixed to form pot mixes, which were sprayed over a black waterborne basecoat that had been pre-baked for 10 minutes at 82.2 ° C. (180 ° F.). The layers were cured for 30 minutes at 140° C. (285° F.) to form coatings having a dry film thickness of 51 microns (2 mil).

Example 8

A two-pack clear coating compositions was prepared by using the following components in parts by weight:

| Silicon/hydroxyl Component | |
|---|---|
| Hydroxy Acrylic Polymer (prepared under Procedure 10) | 70.9 |
| Reactive Oligomer I | 20.3 |
| Cymel ® 303 Melamine Resin | 9.3 |
| UVA/HALS Solution 1* | 10.0 |
| Polybutyl Acrylate Polymer (prepared under Procedure 9) | 0.8 |
| Dodecylbenzene sulfonic acid solution** | 3.0 |
| Aromatic 100 solvent | 18.5 |
| Ethyl 3-ethoxy propionate | 18.5 |
| Crosslinking Component: | |
| 83% Solution of Tolonate ® HDT-LV (isocyanurate trimer of hexamethylene diisocyanate from Rhodia, Inc. of Cranbury, New Jersey) | 28.4 |
| Aromatic 100 solvent | 3.4 |

*UVA/HALS Solution 1 is 70% Aromatic 100, 20% Tinuvin ® 928 and 10% Tinuvin ® 152 supplied by Ciba Specialty Chemicals Corp.
**A solution of dodecylbenzenesulfonic acid (33%) neutralized with 2-aminomethyl propanol in butanol.
Reactive oligomer I was the reaction product of two moles of isocyanatopropyl trimethoxysilane with one mole of cyclohexanedimethanol (as in Procedure 6).

The two components were mixed to form a pot mix, which was sprayed over a black waterborne basecoat that had been pre-baked for 10 minutes at 82.2° C. (180° F.). The layer was cured for 30 minutes at 140° C. (285° F.) to form a coating having a dry film thickness of 51 microns (2 mil).

Comparative Example

A two-pack clear coating comparative composition was prepared by using the following components in parts by weight:

| Silicon/hydroxyl Component | |
|---|---|
| Hydroxy acrylic polymer (prepared under Procedure 8) | 105.0 |
| UVA/HALS Solution 1* | 10.0 |
| Polybutyl Acetate polymer (prepared under Procedure 9) | 0.8 |
| Dodecylbenzene sulfonic acid solution** | 3.0 |
| Aromatic 100 solvent | 17.0 |
| Ethyl 3-ethoxy propionate | 17.0 |
| Crosslinking Component: | |
| 83% Solution of Tolonate ® HDT-LV (isocyanurate trimer of hexamethylene diisocyanate from Rhodia, Inc. of Cranbury, New Jersey) | 9.7 |
| Aromatic 100 solvent | 4.4 |

*UVA/HALS Solution 1 is 70% Aromatic 100, 20% Tinuvin ® 928 and 10% Tinuvin ® 152 supplied by Ciba Specialty Chemicals Corp.
**A solution of dodecylbenzenesulfonic acid (33%) neutralized with 2-aminomethyl propanol in butanol.

The two components were mixed to form a pot mix, which was sprayed over a black waterbome basecoat that had been pre-baked for 10 minutes at 82.2° C. (180° F.). The layer of Comparative Example was cured for 30 minutes at 140° C. (285° F.) to form a coating having a dry film thickness of 51 microns (2 mil).

The coatings from the foregoing Examples were tested for their Tukon hardness, Crocker mar resistance (wet and dry), Laboratory etch resistance and solids percentage adjusted to provide all the Examples with the same viscosity. The results are indicated in Table 3 below:

TABLE 3

| Test | Comp. | Ex. 6 | Ex. 7 | Ex. 8 |
|---|---|---|---|---|
| Hardness (Tukon) | 11.2 | 13.0 | 11.0 | 13.6 |
| Lab. Etch resistance | 65° | 70° | 75° | 65° |
| Dry mar resistance* | 67% | 84% | 86% | 89% |
| Wet mar resistance* | 50% | 81% | 91% | 84% |
| % Solids# | 53.8 | 57.4 | 62.1 | 57.0 |

*Under Crocker Test
Solids needed to produce the same viscosity @ 30" using #4 Ford Cup Examples 6, 7 and 8 demonstrate that clear coating compositions containing silicon reactive oligomers have higher solids, better mar resistance and as good or better etch resistance than a similar clear coating composition (Comparative) containing no silicon reactive oligomer.

What is claimed is:

1. A curable coating composition comprising a binder, which comprises:
   a silicon/hydroxy component and a crosslinking component, said silicon/hydroxy component consists essentially of:
   (I). A silicon/hydroxy reactive oligomer having a linear or branched non-epoxy containing cycloaliphatic moiety and at least two functional groups with at least one of said groups being a silicate and the remaining groups being hydroxyl groups;
   (II). A silicon reactive oligomer having a linear or branched non-epoxy containing cycloaliphatic moiety and having at least two functional groups being silicate or a combination of silane and silicate and a hydroxy acrylic polymer, a hydroxy polyester, a silicon free reactive oligomer having a linear or branched cycloaliphatic moiety and at least two hydroxyl groups or a combination thereof; or
   (III). A combination of said (I) and (II);
   wherein said silicon/hydroxy reactive oligomer, said silicon reactive oligomer and said silicon free reactive oligomer all having a GPC weight average molecular weight not exceeding 4,000 and a polydispersity not exceeding about 1.7; and
   said crosslinking component comprising a blocked crosslinker or an unblocked crosslinker; wherein said blocked or unblocked crosslinkers being provided with at least-two isocyanate groups and wherein the ratio of equivalents of isocyanate per equivalent of hydroxyl groups is in the range of from 0.3/1 to 2.0/1.

2. The composition of claim 1 wherein said hydroxy acrylic polymer component further comprises up to 40 weight percent of a dispersed acrylic polymer, the percentage being based on the total weight of the binder.

3. The composition of claim 1 wherein said hydroxy acrylic polymer has a GPC weight average molecular weight exceeding 3000 and has at least two function groups, at least one of said group being a hydroxy group, the remaining groups being a silane, silicate or a combination thereof.

4. The composition of claim 1 wherein said hydroxy polyester has a GPC weight average molecular weight exceeding 1500 and has at least two functional groups, at least one of said groups being a hydroxy group, the remaining groups being a silicate, or a combination of silicate and silane.

5. The composition of claim 1 wherein said crosslinking component further comprises a non-isocyanate crosslinker selected from the group consisting of an aldimine, melamine-formnaldehyde, ketimine, polyaspartic ester and a combination thereof.

6. The composition of claim 1 wherein said silicon free reactive oligomer is oligomerized by the reaction of an oligomeric acid with a monofunctional epoxy.

7. The composition of claim 6 wherein said oligomeric acid is a reaction product of a multifunctional alcohol with a monomeric anhydride.

8. The composition of claim 7 wherein said oligomeric acid is a reaction product of a multifunctional alcohol with a less than stoichiometric amount of a monomeric anhydride to provide said oligomeric acid with at least one hydroxyl functionality.

9. The composition of claim 6 wherein said monofunctional epoxy is selected from the group consisting of ethylene oxide, butylene oxide, propylene oxide, and a combination thereof.

10. The composition of claim 1 further comprising a catalyst selected from the group consisting of a tin compound, tertiary amine, acetic acid, odecylbenzene sulfonic acid, phenyl acid phosphate, and a combination thereof.

11. The composition of claim 1 further comprising a pigment.

12. A process for producing a coating on the surface of a substrate, said process comprising:
   applying a layer of a curable coating composition on said surface, wherein a binder in said composition comprises a silicon/hydroxy component and a crosslinking component, said silicon/hydroxy component consists essentially of:
   (I). A silicon/hydroxy reactive oligomer having a linear or branched non-epoxy containing cycloaliphatic moiety and at least two functional groups with at least one of said groups being a silicate and the remaining groups being hydroxyl groups;

(II). A silicon reactive oligomer having a linear or branched non-epoxy containing cycloaliphatic moiety and having at least two functional groups being silicate or a combination of silane and silicate and a hydroxy acrylic polymer, a hydroxy polyester, a silicon free reactive oligomer having a linear or branched cycloaliphatic moiety and at least two hydroxyl groups or a combination thereof; or (III). A combination of said (I) and (II);

wherein said silicon/hydroxy reactive oligomer, said silicon reactive oligomer and said silicon free reactive oligomer all having a GPC weight average molecular weight not exceeding 4,000 and a polydispersity not exceeding about 1.7; and said crosslinking component comprising a blocked crosslinker or an unblocked crosslinker; wherein said blocked or unblocked crosslinkers being provided with at least two isocyanate groups and wherein the ratio of equivalents of isocyanate per equivalent of hydroxyl groups is in the range of from 0.3/1 to 2.0/1.

13. The process of claim 12 wherein said layer is cured under ambient conditions or bake-cured at elevated temperatures.

14. A substrate coated in accordance wit the process of claim 12 or 13.

15. A curable coating composition comprising a binder, which comprises:

a silicon/hydroxy component and a crosslinking component, said silicon/hydroxyl component comprising:

(I). A silicon/hydroxy reactive oligomer having a linear or branched non-epoxy containing cycloaliphatic moiety and at least two functional groups with at least one of said groups being a silane or a silicate, the remaining groups being hydroxyl groups;

(II). A silicon reactive oligomer oligomerized by the reaction of a multifunctional alcohol having a linear or branched non-epoxy containing cycloaliphatic moiety with isocyanato silane compound;

wherein said silicon/hydroxy reactive oligomer, and said silicon reactive oligomer all having a GPC weight average molecular weight not exceeding 4,000 and a polydispersity not exceeding about 1.7; and said crosslinking component comprising a blocked crosslinker or an unblocked crosslinker; wherein said blocked or unblocked crosslinker being provided with at least two isocyanate groups and wherein the ratio of equivalents of isocyanate per equivalent of hydroxyl groups is in the range of 0.3/1 to 2.0/1.

* * * * *

UNITED STATES PATENT AND TRADEMARK OFFICE
CERTIFICATE OF CORRECTION

PATENT NO.     : 6,428,898 B1
DATED          : August 6, 2002
INVENTOR(S)    : Barsotti et al.

It is certified that error appears in the above-identified patent and that said Letters Patent is hereby corrected as shown below:

Column 2,
Line 53, replace "odecylbenzene" with -- dodecylbenzene --.

Signed and Sealed this

Eleventh Day of February, 2003

JAMES E. ROGAN
*Director of the United States Patent and Trademark Office*